(12) United States Patent  
Keim

(10) Patent No.: US 7,549,130 B2  
(45) Date of Patent: Jun. 16, 2009

(54) PATTERN-BASED KEYBOARD CONTROLS

(75) Inventor: Oliver G. Keim, Reilingen (DE)

(73) Assignee: SAP AG, Walldorf (DE)

( * ) Notice: Subject to any disclaimer, the term of this patent is extended or adjusted under 35 U.S.C. 154(b) by 610 days.

(21) Appl. No.: 11/001,475

(22) Filed: Nov. 30, 2004

(65) Prior Publication Data

US 2006/0117271 A1    Jun. 1, 2006

(51) Int. Cl.
G06F 3/048 (2006.01)
G06F 3/02 (2006.01)

(52) U.S. Cl. .................. 715/847; 715/798; 345/172

(58) Field of Classification Search .......... 715/529, 715/531, 539, 540, 781, 808, 809, 798, 801, 715/812, 821, 827, 847; 707/100; 345/172, 345/619, 690
See application file for complete search history.

(56) References Cited

U.S. PATENT DOCUMENTS 5,164,900 A * 11/1992 Bernath ................. 715/264
5,694,610 A * 12/1997 Habib et al. ............. 715/531
6,307,549 B1 * 10/2001 King et al. .............. 715/810
6,323,873 B1 * 11/2001 Liebenow ................ 345/619
2003/0090471 A1 * 5/2003 Slaunwhite et al. ....... 345/172

OTHER PUBLICATIONS

The Interaction Design Pattern Page (9 pages), Jan. 2004, http://www.pliant.org/personal/Tom_Erickson/InteractionPatterns.html.

* cited by examiner

Primary Examiner—Weilun Lo
Assistant Examiner—Truc T Chuong
(74) Attorney, Agent, or Firm—Finnegan, Henderson, Farabow, Garrett & Dunner, L.L.P.

(57) ABSTRACT

Systems, methods, and computer program products implementing techniques for pattern-based keyboard controls. In one aspect, the techniques include storing a set of interaction patterns, storing a set of keyboard controls, and associating each of the interaction patterns with one or more of the keyboard controls. Each interaction pattern includes a description of a human computer interaction problem and solution to the problem. Each keyboard control in the set of keyboard controls includes a sequence of keystrokes.

14 Claims, 2 Drawing Sheets

PATTERN-BASED KEYBOARD CONTROLS

BACKGROUND

The present invention relates to data processing by a digital computer, and more particularly to keyboard controls.

Keyboard controls allow for software applications to be controlled through the use of a keyboard. Each keyboard control specifies a sequence of keystrokes that, when pressed, invoke an operation within the software application.

Typically, keyboard controls are not consistent across applications. That is, different sequences of keystrokes are required to invoke the same or similar operation in different applications.

SUMMARY OF THE INVENTION

The present invention provides systems, methods, and computer program products, implementing techniques for pattern-based keyboard controls.

In one aspect, a system in accordance with the invention includes a set of interaction patterns, a set of keyboard controls, and mappings between the interaction patterns and the keyboard controls. Each interaction pattern includes a description of a human computer interaction problem and solution to the problem.

The system can be implemented to include one or more of the following features.

Each keyboard control in the set of keyboard controls specifies a sequence of keystrokes.

The interaction patterns, the keyboard controls, and the mappings are represented as one or more tables.

The database system is a component of an application development environment.

In another aspect, the techniques include storing a set of interaction patterns, each interaction pattern including a description of a human computer interaction problem and solution to the problem; storing a set of keyboard controls; and associating each of the interaction patterns with one or more of the keyboard controls.

The techniques can be implemented to include one or more of the following features.

Each keyboard control in the set of keyboard controls specifies a sequence of keystrokes.

The interaction patterns, the keyboard controls, and the associations are represented as one or more tables.

Receiving user input identifying one or more interaction patterns in the set of interaction patterns; and in response to the user input, identifying the keyboard controls associated with the identified interaction patterns and retrieving the associated keyboard controls.

The invention can be implemented to realize one or more of the following advantages.

A pattern-based approach to developing keyboard controls simplifies application development. Keyboard controls can be reused when applications (or user interface elements within the applications) have matching interaction patterns. Creating documentation (e.g., user's manuals) is also simplified because the same documentation can be reused for multiple applications.

Pattern-based keyboard controls are consistent across multiple applications and therefore are intuitive and easy for users to learn and remember.

One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
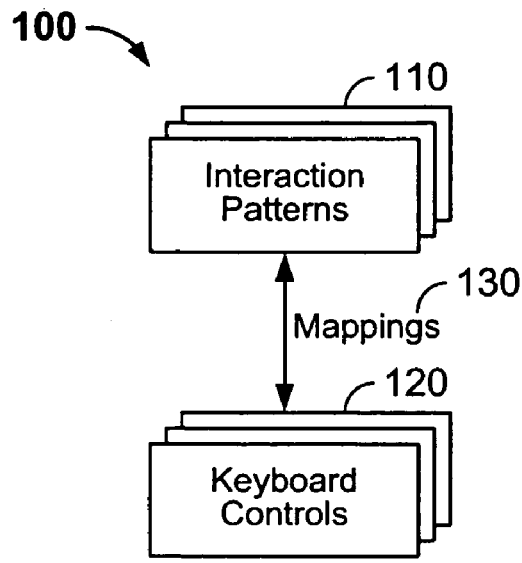
FIG. 1 illustrates a database system in accordance with the invention.

As shown in FIG. 1, a database system 100 in accordance with the invention includes a set of interaction patterns 110. Interaction patterns 110 are well known in the field of human computer interaction and are sometimes referred to in this field as interaction design patterns, or user interface design patterns.

Figure 2:
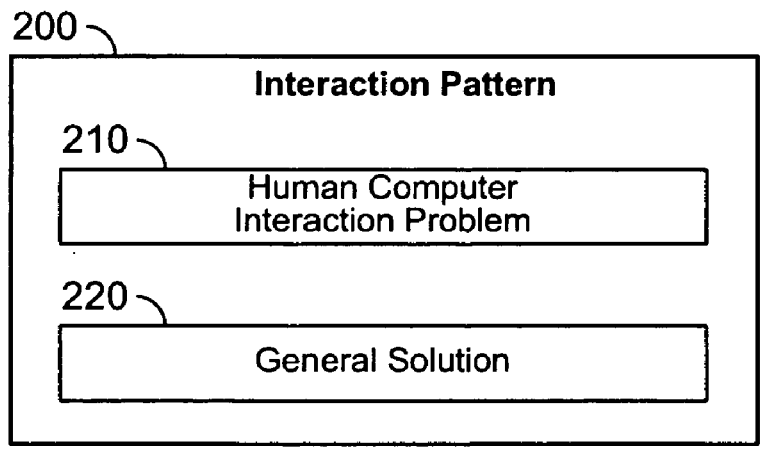
FIG. 2 illustrates an interaction pattern.

In general, as shown in FIG. 2, an interaction pattern 200 includes a description of a human computer interaction problem 210 that is common to multiple applications and a description of a general solution 220 to this problem. For example, one common human computer interaction problem is that when a document is displayed by a software application, only a portion of the document is visible at a given time. One solution to this problem is for the software application to provide a scrolling mechanism that allows a user to scroll to another portion of the document, which is then made visible.

In addition to a problem description and a solution description, the interaction pattern 200 can also include additional content, for example, a title, context information that describes application scenarios where the interaction pattern is applicable, examples of how the interaction pattern has been used in specific application scenarios, and identification of related patterns, that is, patterns that are often used together. This is further described in Table 1 below.

Figure 3:
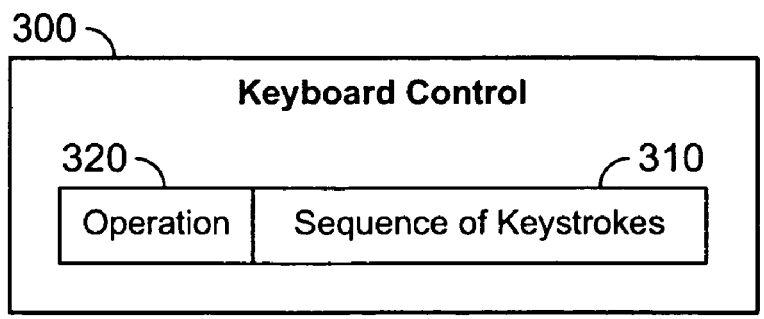
FIG. 3 illustrates a keyboard control.

The database system 100 also includes a set of keyboard controls 120. As shown in FIG. 3, a keyboard control 300 specifies a sequence of keystrokes 310 that, when pressed, invoke an operation 320.

Figure 4:
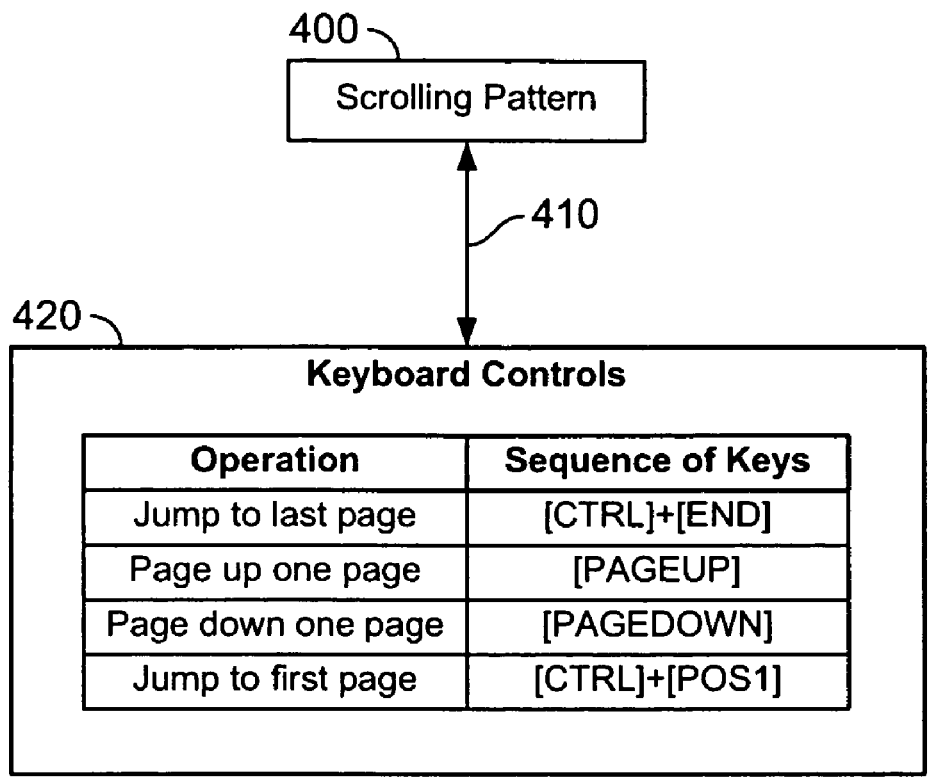
FIG. 4 illustrates a scrolling pattern and its associated keyboard controls.

The database system 100 also includes mappings 130 between the interaction patterns 110 and the keyboard controls 120. The mappings 130 associate each interaction pattern 110 with one or more keyboard controls 120 that can be used to implement the solution described in the pattern. For example, FIG. 4 illustrates keyboard controls 420 associated 310 with the scrolling pattern 400 described earlier. Additional interaction patterns and their associated keyboard controls are illustrated in the Table 1 below.

TABLE 1

Activation

| Title | Activation | Keyboard Handling Pattern |
|---|---|---|

Related Behaviors

| | |
|---|---|
| Context | Some function has to be started, a navigational jump has to be initiated |
| Description | Activate an element, item, function, navigational jump, etc. |
| Forces | User clicks on a UI element to trigger the action or he uses the keyboard to do the |
| Solution | A UI element offers a possibility to trigger a function. This offering has to be visualized so the user perceives the additional functionality. |

Keyboard Mapping

| Function | Press | To | Severity |
|---|---|---|---|
| DefaultActivation | [Enter] | Activates a default button, if a default button is available on a dialog. | Optional |
| Acclerator | [Alt]+[Any] | Activate the action behind a UI element directly, without having to move the keyboard focus the target element before. The offered accelerator key will be displayed as an underlined character within the UI elements label text. | Optional |
| FocusActivation | [Space] and/or | Activate an UI element if the keyboard focus is on the target element. Space and Enter can be used both or separate. Example: Buttons and links in IE support both | Mandatory |

Application Hotkey Standard

| Title | Application Hotkey Standard | Keyboard Handling Pattern |
|---|---|---|

Related Behaviors

| | |
|---|---|
| Context | Menu Hotkey Standards, based on Microsoft Windows, Linux Gnome Interface Design |
| Description | Standard hotkey list to be used by desktop applications. Desktop applications means applications running native on Microsoft Windows, Apple MacInstosh, Linux, OS2 and other desktop environments. These shortcuts define generally accepted application hotkeys to easily address often used functions. |
| Forces | Desktop application |
| Solution | |

Keyboard Mapping

| Function | Press | To | Severity |
|---|---|---|---|
| EditDeselectAll | | Deselect all available items | Optional |
| EditCopy | [Ctrl]+[c] | Copy content to clipboard | Optional |
| EditCut | [Ctrl]+[x] | Cut content to clipboard | Optional |
| EditPaste | [Ctrl]+[v] | Paste content from clipboard | Optional |
| EditPasteSpecial | [Shift]+[Ctrl]+[v] | Paste special format contents from clipboard | Optional |
| EditDuplicate | | Duplicate current <item(s)|selection> | Optional |
| EditUndo | [Ctrl]+[z] | Undo last change | Optional |
| EditSelectA | | | |
| FilePrint | | Print current <file|object> | Optional |
| EditFind | [Ctrl]+[f] | Find item | Optional |
| EditDelete | | Delete current <item(s)|selection> | Optional |
| FileClose | [Ctrl]+[w], [Ctrl]+[F4] | Close current <file|object> | Optional |
| EditFindNext | [Ctrl]+[g] | Find next item | Optional |
| FileSendTo | | Send current <file|object> as email | Optional |
| EditRedo | [Ctrl]+[y] | Redo last undo | Optional |
| FilePrintPreview | | Preview print output of current <file|object> | Optional |
| FileRevert | | Revert current <file|object> to last saved version. | Optional |
| FileSaveCopyAs | | Save a copy of current <file|object> under a new | Optional |
| FileSaveAs | [Alt]>[f]>[a] | Save current <file|object> under a new name | Optional |
| FileSave | [Ctrl]+[s], | Save current <file|object> | Optional |
| FileOpen | [Ctrl]+[o], [Alt]>[f]>[o] | Open an existing <file|object> | Optional |
| FileNew | [Ctrl]+[n], [Alt]>[f]>[n] | Create a new <file|object> | Optional |
| FileProperties | [Alt]+[Enter] | Show properties of current <file|object> | Optional |
| GoNextPage | [PageDown] | Go to next document page (sequential navigation) | Optional |
| FileQuit | [Ctrl]+[q], [Alt]+[F4] | Close Application | Optional |
| EditFindPrevious | [Shift]+[Ctrl]+[g] | Find previous item | Optional |
| HelpTopic | [Ctrl]+[F1] | Get help to current focussed UI element or item | Optional |
| HelpContents | [F1] | Get the help's content page of. | Optional |
| GoLastPage | [Ctrl]+[End] | Go to last document page (direct navigation) | Optional |
| GotoPage | [Ctrl]+[g] | Go to given document page (direct navigation) | Optional |
| GoPreviousPage | [PageUp] | Go to previous document page (sequential navigation) | Optional |

TABLE 1-continued

| | | | | |
|---|---|---|---|---|
| GoLocation | [Alt]+[d] (enUS) | Go to a different location (webbrowser URL, explorer address bar) | | Optional |
| GoHome | | Go to home directory (explorer), or home page | | Optional |
| FormatBold | | Format selected items with or change cursor to bold | | Optional |
| GoForward | [Alt]+[Right] | Go to follow up view/webpage | | Optional |
| GoBack | [Alt]+[Left], [Alt]+[Backspace] | Go to previous view/webpage | | Optional |
| BookmarksEdit | | Edit the bookmark list | | Optional |
| EditReplace | [Ctrl]+[h] | Replace item(s) with different item(s) | | Optional |
| BookmarksAdd | | Add a bookmark to bookmark list | | Optional |
| ViewRefresh | [Ctrl]+[r] | Refresh current view | | Optional |
| FormatUnderline | | Format selected items with or change cursor to underlined typeface | | Optional |
| FormatItalic | | Format selected items with or change cursor to italic | | Optional |
| GoUp | [Alt]+[Up], | Go up a level (explorer), webpage (webbrowser) | | Optional |
| GoFirstPage | [Ctrl]+[Home] | Go to first document page (direct navigation) | | Optional |

Auto Completion

| | | |
|---|---|---|
| Title | Auto Completion | Keyboard Handling Pattern |
| Related Behaviors | Path Completion; Item Quick Access | |
| Context | Speed up text input by providing defaults | |
| Description | Text input will be much easier, if entered keystrokes are mapped against given default text values. | |
| Forces | User enters characters into input field<br>Control searches for best match<br>Control auto completes text and preselects auto completed text | |
| Solution | The field automatically completes the typed information by the best matching default text value and selects the auto appended characters. The user's next keystroke will delete the selected section, completing the entered text before the previously selected area. Another auto complete process starts over. | |

Keyboard Mapping

| Function | Press | To | Severity |
|---|---|---|---|
| Any | [Any] | add characters or digits into an input field. Previously selected parts of the input field's text will be erased by adding a new character, digit or sign. | Mandatory |
| StripSelectedText | [Delete], [Backspace] | remove automatically selected text if this field can be freely edited and the input field's content is not limited to the dropdownlist's values. | Mandatory |

Circular Paging

| | | |
|---|---|---|
| Title | Circular Paging | Keyboard Handling Pattern |
| Related Behaviors | | |
| Context | Page through some pages and start over with the first/last page. | |
| Description | Several page indicators (tabstrips) are displayed simultaneously. Paging is available, if the last page has been reached the paging continues with the first page. Same behavior when paging back. | |
| Forces | User pages one page forward or<br>User pages one page backward | |
| Solution | At a special place the page indicators are displayed. The active page is visualized in selected state. All others in active state. Selecting a different page indicator pushes this page to front while the current page gets into the background. | |

Keyboard Mapping

| Function | Press | To | Severity |
|---|---|---|---|
| PreviousTab | [Shift]+[Ctrl]+[Tab] | Page to previous page (used in some applications, this may interfere with Macro Navigation) | Optional |
| PreviousTab | [Ctrl]+[PageUp] | Page to previous page | Mandatory |
| NextTab | [Ctrl]+[Tab] | Page to next page (Some user interfaces use this keystroke too.) | Optional |
| NextTab | [Ctrl]+[PageDown] | Page to next page | Mandatory |

Click&Select

| | | |
|---|---|---|
| Title | Click&Select | Mouse & Keyboard Handling |
| Related Behaviors | Extras On Request | |
| context | Select one of several items, where the items count is between 1 and 15. (So a pretty small options list)<br>Selected options are not editable nor is a custom option possible. | |

TABLE 1-continued

| | |
|---|---|
| Description | Selection should be done quickly, there is no inputfield available or necessary. |
| Forces | User intents to change |
| | User navigates to the selection option element |
| | User opens the selection options list/view. |
| | User selects one option |
| Solution | The selection options will be displayed in a box that pops up, if the selection box is clicked. (Keyboard -> Extras on Request) |
| | The box comes up and aligns it's position to the currently selected option. The mouse cursor is now moved to the target option. (Keyboard -> Free Focus Movement) The mouse button is released after the target option has been reached. (Keyboard -> Extras |

Keyboard Mapping

| Function | Press | To | Severity |
|---|---|---|---|
| Extras On Request | All | This behavior is related to Extras On Request behavior and all it's keystrokes will be reused here. | Mandatory |

Clipboard

| | | | |
|---|---|---|---|
| Title | Clipboard | | Keyboard Handling Pattern |

Related Behaviors

| | |
|---|---|
| Context | Transferring things from one place to another, to copy or move. |
| Description | For transferring information from one point to another the computer system offers a place, where any kind of information can be saved temporarily, the "Clipboard". Once the information has been taken to that place, it can be added to another place, depending on the target place accepts the current information. |
| Forces | User needs to navigate to the source |
| | User needs to copy the source |
| | User needs to navigate to the target |
| | User needs to paste into the target |
| Solution | The source object has to be selected and an action for transferring the object's information to the clipboard has to follow. Depending on the copy or move intention, two different options must be available to the user to distinguish between both modes. Option one copies the information, option two cuts out the information. (If cutting out is intended, the source must not be read-only) |
| | The object insertion has to be at a place which is also not in a read only state. An option |

Keyboard Mapping

| Function | Press | To | Severity |
|---|---|---|---|
| Cut1 | [Ctrl]+[x] | Cut out the selected items and places them into the windows clipboard. In most cases the selected items disappear, so the user must always remember what he has cut out last. Excel uses a better solution, the cut out items are visualized as "cut out" and will be removed | Mandatory |
| Copy2 | [Ctrl]+[Insert] | Copy the selected items or texts into the clipboard. Label texts can be copied as well. Frequently used by professional keyboard users. | Efficiency |
| Paste2 | [Shift]+[Insert] | Paste the items from the clipboard; old CUA styled paste function, frequently used by professional keyboard users. | Efficiency |
| Copy1 | [Ctrl]+[c] | Copy the selected items or texts into the clipboard. Label texts can be copied as well. | Mandatory |
| Paste1 | [Ctrl]+[v] | Paste the clipboard items. | Mandatory |
| Cut2 | [Shift]+[Delete] | Cut out the selected items and places them into the windows clipboard. CUA styled cut function. | Efficiency |

Content Filtering

| | | | |
|---|---|---|---|
| Title | Content Filtering | | Control Design Pattern |

Related Behaviors

| | |
|---|---|
| Context | To much information is displayed at once. |
| Description | Information size must be reduced to speed up interaction, e.g. in a list containing 10.000 files it is hard to get an overview over a special kind of file types. |
| Forces | User has to key in data for criteria matching |
| | Rich visual feedback: The list will be reduced every time a new key was input. |
| | A search button has to be selected if performance is untamable for rich visual |
| Solution | Based on predefined pattern matching criterias the keyed in information is used to reduce the information size. In our example the list can be reduced to types, depending on the input data the user provided. |
| | The content of a list will then be reduced for easier list item identification. |

TABLE 1-continued

Keyboard Mapping

| Function | Press | To | Severity |
|---|---|---|---|
| Unshrink | [Backspace], [Delete] | enlarge a related list's content to show more items. | Mandatory |
| Shrink | [Any] | reduce a related list's content to show less items. | Mandatory |

Context Menu

| Title | Context Menu | Keyboard Handling Pattern |
|---|---|---|

Related Behaviors

| | |
|---|---|
| Context | Offer additional contextual functions |
| Description | Working with items or objects some additional functions are needed to process these items or objects. In good designed programs the main menu offers those functions within the "Edit" menu.<br>Instead of forcing the use to move the mouse to the top of the window to address the |
| Forces | User selects item(s)/object(s)<br>User wants to do some action on these objects<br>User triggers the context menu display<br>User selects a contextual function |
| Solution | Open up a contextmenu after right mouse button click and show the menu right at the current mouse cursor's position, if triggered via mouse. If triggered by the keyboard show the menu near the selected items and the focus. |

Keyboard Mapping

| Function | Press | To | Severity |
|---|---|---|---|
| Open1 | [ContextMenu] | Open a context menu on current focussed item | Mandatory |
| Navigate | [Up] or [Down] | Move to previous/next menu item. Separator lines cannot be focussed. | Mandatory |
| CloseSubMenu | [Left] or [Right] | Close a sub menu and jump to the parent menu item if keycode is apropriate to current menu visualization | Mandatory |
| Open2 | [Shift]+[F10] | Open a context menu on current focussed item | Mandatory |
| SelectItem | [Enter] | Select the focussed menu item and its function. The context menu closes then. | Mandatory |
| CloseMenu | [Escape] | Close one popup menu level each. On the first level the context menu is closed. | Mandatory |
| Accellerators | [Any Character] | Quick Access to menu items by typing alphanumeric characters, e.g. 'p' for 'properties' (p is underlined) | Optional |
| OpenSubMenu | [Right] or [Left] or [Enter] | Open a sub menu beyond the current focussed menu item. The menu item must show a visual indicator that more menu items exist. | Mandatory |

Deletion

| Title | Deletion | Keyboard Handling Pattern |
|---|---|---|

Related Behaviors

| | |
|---|---|
| Context | Unnecessary Items, elements or objects |
| Description | Item, element or object has to be deleted |
| Forces | User deletes the item/element/object |
| Solution | The deletion action will be started by a keystroke or a mouse action. Via mouse the action should be available in another context menu, the delete keystroke should be available if the object deletion is possible. |

Keyboard Mapping

| Function | Press | To | Severity |
|---|---|---|---|
| Delete | [Delete] | delete the focussed or selected item(s) | Mandatory |

Dialog Termination

| Title | Dialog Termination | Keyboard Handling Pattern |
|---|---|---|

| | |
|---|---|
| Related Behaviors | Escape; Accelerator |
| Context | Dialog is open and should be closed. |
| Description | An option dialog is open and should be closed to apply or revert changes made within |
| Forces | User applies changes<br>User reverts changes |
| Solution | The dialog offers two actions, an OK action to apply changes and a cancel action. If the dialog also contains an apply action and changes have been applied to the application, the cancel action should undo applied changes. |

TABLE 1-continued

Keyboard Mapping

| Function | Press | To | Severity |
|---|---|---|---|
| Apply | [Alt]+[Any] | Quick Access Code for applying dialog changes. Any key is related to the underlined character of the apply button's label text. | Optional |
| Escape | [Escape] | Close a dialog and revert changes made in the dialog. If the dialog offered an "Apply" button, the applied changes are also undone. | Mandatory |
| Accept | [Enter] | Close a dialog and accept changes made | Mandatory |
| Accellerators | [Any] | Accellerator keys for the terminating buttons. | Optional |

Direct Field Access

| | | |
|---|---|---|
| Title | Direct Field Access | Keyboard Handling Pattern |
| Related Behaviors | | |
| Context | Lots of UI elements, such as input fields, checkboxes, etc are available on a screen component. Quickly get somewhere. | |
| Description | Opportunity to quickly and directly get somewhere. Will be given by Accelerator keys offered in the description labels of the UI elements. (Underscored character) | |
| Forces | User intends to jump directly to a dedicated place on the screen | |
| Solution | By direct field navigation you can jump to a given UI element by typing a special keyboard shortcut. In Microsoft Windows programs this can be done by using [Alt] with a character key.<br>The UI element usually visualizes the keyboard shortcut within its description text. The description text underlines the character that can be pressed together with [Alt] to | |

Keyboard Mapping

| Function | Press | To | Severity |
|---|---|---|---|
| Accelerator | [Alt]+[AcceleratorKey] | By pressing Alt plus the offered accelerator key a direct focus jump to the target place takes place. If several elements offer the same accelerator key, multiple keystrokes circulate through the UI elements with the same accelerator keys. (Check out the popup menus, it | Mandatory |

Double Click

| | | |
|---|---|---|
| Title | Double Click | Keyboard Handling Pattern |
| Related Behaviors | Inline Editing; | |
| Context | Lists, Grids, etc offer lots of items. | |
| Description | A default action on a item should be started | |
| Forces | User starts the default action by<br>double clicking<br>context menu, then selecting first menu item (the default item)<br>using the keyboard | |
| Solution | Attention: These keystrokes may interfere with other application defined keystroke | |

Keyboard Mapping

| Function | Press | To | Severity |
|---|---|---|---|
| ExtraDoubleClick | second [F2] | On editable cells the first keystroke invokes inplace editing, a second starts underlying functions. | Optional |
| DoubleClick | [F2] | PickUp—starts an underlying action | Mandatory |
| Enter | [Enter] | start an underlying action/dialog | Optional |
| Properties | [Alt]-[Enter] | open a properties or meta data dialog or view. (If a view is used, this keystroke works as a toggle function to return again to the previous view.) | Optional |

Drag'n Drop

| | | |
|---|---|---|
| Title | Drag'n Drop | Mouse & Keyboard Handling |
| Related Behaviors | Clipboard | |
| Context | An object/item should be placed somewhere else. | |
| Description | The item should be moved or copied to another place on the screen. | |
| Forces | User selects object(s)<br>User grabs the objects<br>User directs the object using the mouse<br>User releases the objects at target place. | |
| Solution | Using Drag'n Drop objects can be moved around without having to know technical knowledge of their current technical localization. | |

TABLE 1-continued

Keyboard Mapping

| Function | Press | To | Severity |
|---|---|---|---|
| Copy | [Ctrl]+[c] And/Or [Ctrl]+[Insert] | Copy an item/element to the drag and drop clipboard from the drag source | Mandatory |
| Paste | [Ctrl]+[v] And/Or [Shift]+[Insert] | Paste an item/element to the drag and drop clipboard to the drop target | Optional |
| Move | [Ctrl]+[x] And/Or [Shift]+[Delete] | Cut an item/element to the drag and drop clipboard from the drag source | Optional |

Escape

| Title | Escape | Keyboard Handling Pattern |
|---|---|---|
| Related Behaviors | | |
| Context | Something not intended had happened. | |
| Description | To get out of an unintended situation an escape functionality is needed. | |
| Forces | User perceives the situation as not wanted. User escapes the situation | |
| Solution | Keystroke to get out of an unpredictable state or situation. Stacked situations require multiple escape keystrokes, each situation exactly one. If stacked situations (n) are possible be sure that an unintentional n + 1 escape keystroke does not cancel an | |

Keyboard Mapping

| Function | Press | To | Severity |
|---|---|---|---|
| Escape | [Escape] | Escape current situation. | Mandatory |

Expand/Collapse

| Title | Expand/Collapse | Keyboard Handling Pattern |
|---|---|---|
| Related Behaviors | Level Navigation; Free Cursor Movement; | |
| Context | Hierarchies are displayed. Some information is hidden beyond hierarchy nodes. | |
| Description | Hidden elements should be displayed, shown elements should be hidden. | |
| Forces | User expands a node User collapses a node | |
| Solution | Show items beyond an item or hide elements. Used to toggle the display of those subitems. If the cursor left and right keys are already used by the same UI element, the left and right keys may not be used for expanding and collapsing. | |

Keyboard Mapping

| Function | Press | To | Severity |
|---|---|---|---|
| Collapse2 | [Num Pad −] | Collapse current node, does not move the focus position. | Mandatory |
| CollapseAll | | | Optional |
| Collapse1 | [Left] | Move focus to parent node and collapse parent node | Optional |
| ExpandAll | [Num Pad *] | Expand all tree items beyond the current. | Optional |
| Expand2 | [Num Pad +] | Open a collapsed node, does not move the focus position. | Mandatory |
| Expand1 | [Right] | Open a collapsed tree node. Moves the focus to the first sub item. | Optional |
| MediumSize | [Num Pad *] | Minimize/Restore/... | Optional |

Expression Evaluation

| Title | Expression Evaluation | Keyboard Handling Pattern |
|---|---|---|
| Related Behaviors | Tokenized Editing | |
| Context | Value Input Fields | |
| Description | | |
| Forces | | |
| Solution | | |

Keyboard Mapping

| Function | Press | To | Severity |
|---|---|---|---|
| KeyboardInput | Chars, Digits, etc | add any keys needed to express a formula. After leaving the field or pressing [Enter] the target value will be evaluated or calculated and displayed. | Optional |

TABLE 1-continued

Extras On Demand

| | |
|---|---|
| Title | Extras On Demand — Keyboard Handling Pattern |
| Related Behaviors | Escape, Micro Navigation |
| Context | Additional helper dialogs for input help are available. |
| Description | Depending on the format of an input field a specific helper dialog is available to help to select/search the best value. |
| Forces | User perceives the availability of the helper<br>User requests the helper |
| Solution | Function to explicitly acquire a gui helper dialog to find, identify or enter an item, text or |

Keyboard Mapping

| Function | Press | To | Severity |
|---|---|---|---|
| OpenExtrasSAP | [F4] | Open a helper dialog with server roundtrip processing/selection. (SAP style helper dialogs) | Optional |
| Accept | [Enter] | Accept the changes, close helper dialog. | Mandatory |
| OpenHistoryList | [Backspace] | Open the history list of a editable field. Works on empty input fields or if the text cursor is positioned before the first text character. | Optional |
| AcceptNext | [Tab] | Close the helper dialog, applied changes are accepted and passed to the associated field. | Optional |
| CloseExtras2 | [Escape] | Close the helper dialog without manipulating anything, applied changes are reverted. | Mandatory |
| CloseExtrasStandard | [Alt]+[Up] | Close the helper dialog, applied changes are accepted and passed to the associated field. | Mandatory |
| OpenExtrasStandard | [Alt]+[Down] | Open a helper dialog for input help or closes a helper window (toggle functionality), changed selections within the helper dialog are accepted and passed to the | Mandatory |

Field Caret Navigation

| | |
|---|---|
| Title | Field Caret Navigation — Keyboard Handling Pattern |
| Related Behaviors | |
| Context | Mulitple words are available in a text editor or input field. |
| Description | Fokus should be moved to a different place within the field's content. |
| Forces | User navigates to the target place |
| Solution | Using the keystrokes the user can more or less quickly navigate to the target place. |

Keyboard Mapping

| Function | Press | To | Severity |
|---|---|---|---|
| End | [End] | Move caret after last word/character | Mandatory |
| Left | [Left] | Move caret one item to the left | Mandatory |
| Right | [Right] | Move caret one item to the right | Mandatory |
| WordLeft | [Ctrl]+[Left] | Move caret one word to the left | Optional |
| WordRight | [Ctrl]+[Right] | Move caret one word to the right, if rightmost word was reached another keystroke jumps behind the last word. | Optional |
| Pos1 | [Home] | Move caret before first word/character | Mandatory |

Focus Propagation

| | |
|---|---|
| Title | Focus Propagation — Control Design Pattern |
| Related Behaviors | |
| Context | Focusses embedded objects |
| Description | Route focus management through controls or elements. |
| Forces | Control routes through all focus events. |
| Solution | Controls have to implement or route through the FocusIn and FocusOut events. |

Keyboard Mapping

| Function | Press | To | Severity |
|---|---|---|---|
| FocusOut | any | unfocus embedded UI element or control. Save last focussed element for later refocus if multiple elements are embedded within this container and focus state saving is important to the interaction design. | Mandatory |
| FocusIn | any | focus embedded UI element or control. | Mandatory |

TABLE 1-continued

Framework Hotkeys (SAPGUI)

| | | |
|---|---|---|
| Title | Framework Hotkeys (SAPGUI) | Keyboard Handling Pattern |

Related Behaviors

| | |
|---|---|
| Context | Reach special local functionality of the SAPGUI framework application. These hotkeys do not have backend functionality. |
| Description | SAPGUI has several additional functions that should be available to user commands. Such additional functions are:<br>Options dialog<br>Creation of a new session mode<br>Creation of a sapgui shortcut<br>Printing the current view as a hard copy<br>Jumping to the first edit field in the client area |
| Forces | User's knowledge of the additional functions as well as the keystroke mapping. |
| Solution | |

Keyboard Mapping

| Function | Press | To | Severity |
|---|---|---|---|
| ShowTooltip | [Shift]+[Ctrl]+[q] | Display the tooltip of a focussed UI element | Mandatory |
| GotoToolbar | [Shift]+[Ctrl]+[b] | new: Set the focus to the application toolbar (for efficiency purposes) | Efficiency |
| ShowSAPLogon | [Shift]+[Ctrl]+[l] | new: Goto SAPLogon Program | Efficiency |
| ShowSessionMenu | [Shift]+[Ctrl]+[m] | new: Goto SAPGui Sessions Menu (the overview over all sapgui sessions running in this Microsoft Windows session) | Efficiency |
| StopTransaction | [Shift]+[Ctrl]+[t] | Stops a long running transaction in current session. | Mandatory |
| GotoFirstElement | [Shift]+[Ctrl]+[i] | Jump to first available ui element on the screen | Mandatory |
| NewShortcut | [Shift]+[Ctrl]+[c] | Create a new sapgui shortcut on the desktop | Mandatory |
| NewSession | [Shift]+[Ctrl]+[n] | Create a new sapgui session window | Mandatory |
| Hardcopy | [Shift]+[Ctrl]+[p] | Create a window hardcopy on default printer | Mandatory |
| AccessOptionsMenu | [Shift]+[Ctrl]+[w] | Open the local menu of sapgui for local options. | Mandatory |
| AccessSettings | [Shift]+[Ctrl]+[s] | Shortcut to open the options dialog. | Mandatory |
| GotoOKCodeField | [Shift]+[Ctrl]+[o] | Jump into the OK Code Field | Mandatory |

Framework Hotkeys (WebGui)

| | | |
|---|---|---|
| Title | Framework Hotkeys (WebGui) | Keyboard Handling Pattern |

| | |
|---|---|
| Related Behaviors | Group Navigation |
| Context | Reach special functionality around the WebGUI framework application. |
| Description | WebGUI has additional functions that should be available to user commands. Such additional functions are:<br>Opening the main menu |
| Forces | User's knowledge of the additional functions as well as the keystroke mapping. |
| Solution | |

Keyboard Mapping

| Function | Press | To | Severity |
|---|---|---|---|
| MenuAccess | [Alt]+[m] | Opens the main menu | Mandatory |
| SkipToFirst | [Alt]+[Home] | Jump to the first item of a dialog group | Mandatory |
| SkipToLast | [Alt]+[End] | Jump to the last item of a dialog group | Mandatory |

Free Cursor Movement

| | | |
|---|---|---|
| Title | Free Cursor Movement | Keyboard Handling Pattern |

| | |
|---|---|
| Related Behaviors | Level Navigation |
| Context | Squared area where multiple items are placed on the x and y axis. |
| Description | Move a text caret or cell/object focus cursor to other items near the actual focus position, not matter if vertically or horizontally. |
| Forces | User navigates horizontally or<br>User navigates vertically |
| Solution | Move around the focus within an area by using the cursor keys, which map the free focus movement best. |

Keyboard Mapping

| Function | Press | To | Severity |
|---|---|---|---|
| FirstPos | [Home] | Move the focus position to the first position of a text or | Mandatory |
| MoveLeft | [Left] | Move the focus position to the left | Mandatory |
| MoveRight | [Right] | Move the focus position to the right | Mandatory |
| MoveUp | [Up] | Move the focus position up | Mandatory |

TABLE 1-continued

| | | | |
|---|---|---|---|
| MoveDown | [Down] | Move the focus position down | Mandatory |
| LastPos | [End] | Move the focus position to the last position of a text or | Mandatory |

Graphical Panning

| Title | Graphical Panning | Keyboard Handling Pattern |
|---|---|---|
| Related Behaviors | Zooming | |
| Context | Zoomed View Content, only a part of the complete document/content is visiable. | |
| Description | A different part of the content should be displayed. | |
| Forces | User wants to see another part of the content in same detail level. | |
| Solution | Scrolling content beyond a viewport without having any scrollbars. Usually used for geographical displays, where scrollbars would make no (real) sense. | |

Keyboard Mapping

| Function | Press | To | Severity |
|---|---|---|---|
| AccuratePanUp | [Ctrl]+[Up] | Scroll exactly one step up (1 pixel for pixelbased form | Optional |
| AccuratePanDown | [Ctrl]+[Down] | Scroll exactly one step down (1 pixel for pixelbased form editors) | Optional |
| PanUp | [Up] | Scroll up | Mandatory |
| PanLeft | [Left] | Scroll to the left, do not use single pixel scroll! (Fast | Mandatory |
| PanPageDown | [PageDown] | Scroll one page down | Optional |
| PanRight | [Right] | Scroll to the right, do not use single pixel scroll! (Fast | Mandatory |
| PanHorizRight | [Alt]+[PageDown] | Scroll one page right | Optional |
| AccuratePanRight | [Ctrl]+[Right] | Scroll exactly one step to the right (1 pixel for pixelbased form editors) | Optional |
| AccuratePanLeft | [Ctrl]+[Left] | Scroll exactly one step to the left (1 pixel for pixelbased form editors) | Optional |
| PanPageLeft | [Alt]+[PageUp] | Scroll one page left | Optional |
| PanDown | [Down] | Scroll down | Mandatory |
| PanPageUp | [PageUp] | Scroll one page up | Optional |

Grid Column Management

| Title | Grid Column Management | Keyboard Handling Pattern |
|---|---|---|
| Related Behaviors | Object Editing; Item Selection | |
| Context | Grid navigation interaction context, grid columns are to be changed. | |
| Description | Grid columns properties can be changed:<br>Width<br>Position<br>Sort Order (None, Ascending, Descending)<br>Visible/Invisible<br>Filtering | |
| Forces | Column headers to be focussed<br>User triggers apropriate keyboard actions<br>User triggers with mouse actions | |
| Solution | If the column headers are focussed the focus can be set on any column. Using the "Item Selection" behavior several columns can be selected.<br>On base of the selected column(s) specific actions are available: Resize, Reorder, Sort. These actions are directly mapped to keystrokes also used in the "Object Editing" behavior or by using specific hotkeys.<br>If column management is also used for row management the axis will be swichted, so the cursor keys work 90° rotated! This depends on the selected areas, which means it depends on selected rows or selected columns. Both together is not available. | |

Keyboard Mapping

| Function | Press | To | Severity |
|---|---|---|---|
| ReorderToRight | [Ctrl]+[Right] | move column to the right | Optional |
| ChangeWidth | [Shift]+[Left|Right] | Reduces or enlarges the width of column, if multiple columns are selected all columns will be resized accordingly | Optional |
| FocusRight | [Right] | move focus to next column | Optional |
| InvokeColumnNavMo | [Alt]+[Up] | jump from current cell position to the column headers for further interactions. | Mandatory |
| RevokeColumnNavMo | [Alt]+[Down] | jump from the current header element back to last focussed cell for grid interactions. | Mandatory |
| SortDescending | [Ctrl]+[Down] or [Ctrl]+[Left] | sort content from Z to A, if used on row management, this is mapped to [Ctrl]+[Left] | Optional |
| SortAscending | [Ctrl]+[Up] or [Ctrl]+[Right] | sort content from A to Z, if used on row management, this is mapped to [Ctrl]+[Right] | Optional |
| SortNone | <not mapped> | remove sorting | Optional |
| SelectAllElements | [Ctrl]+[a] | Selects all columns (context: if column headers are | Optional |
| Edit | [F2] | Inline edit the title (if this function should be available) | Optional |
| ChangeHeight | [Shift]+[Up|Down] | Reduces or enlarges the height of column, if multiple columns are selected all columns will be resized accordingly | Optional |

TABLE 1-continued

| | | | |
|---|---|---|---|
| ReorderToLeft | [Ctrl]+[Left] | move column to the left | Optional |
| FocusLeft | [Left] | move focus to previous column | Optional |
| PreviousElement | [Shift]+[Tab] | focus previous element | Optional |
| NextElement | [Tab] | focus next element | Optional |
| RequestProperties | [Alt]+[Enter] | display properties dialog or view, use a second keystroke to return focus to the element. | Optional |

Grid Selection

| | | | |
|---|---|---|---|
| Title | Grid Selection | | Keyboard Handling Pattern |

Related Behaviors

| | |
|---|---|
| Context | A grid is available on the screen. |
| Description | Grid based selections, to quickly select full rows, columns or cell ranges. |
| Forces | User wants to select special cells, whether a single cell or multiple cells. |
| Solution | Different keystrokes offer selection of predefined areas. Using free focus movement along with the shift modifier key automatically selects a range. Other keystrokes do rather predefined selections, such as one keystroke for selecting a complete row or |

Keyboard Mapping

| Function | Press | To | Severity |
|---|---|---|---|
| RowSelect | [Shift]+[Space] | Select the complete row where the focus position is | Mandatory |
| ApplicationSelectAll | [Ctrl]+[a] | Hotkey for selecting all elements. (to be implemented by the application) | Optional |
| SelectAll | [Shift]+[Ctrl]+[Space], [Ctrl]+[a] | Select the whole grid content, alternatively use | Optional |
| ToggleSelect | [Ctrl]+[Space] | Alternative: This keystroke can also be used for toggling the selected row. | Optional |
| ColumnSelect | [Ctrl]+[Space] | Select the complete column where the focus is located in. | Mandatory |
| RemoveSelection | [Left\|Right\|Up\|Down] | Remove the previously defined selection. | Optional |
| RangeSelect | [Shift]+[Left\|Right\|Up\|Down] | Select a range of items/cells/characters while moving the focus position with the arrow keys as long as the Shift key is pressed. A move without the Shift key removes the previous selection. | Optional |

Group Navigation

| | | | |
|---|---|---|---|
| Title | Group Navigation | | Keyboard Handling Pattern |

Related Behaviors

| | |
|---|---|
| Context | Many dialog items on the screen. Information is clustered into groups. |
| Description | Groups display information that belong together. Several groups are on the screen at the same time. |
| Forces | User wants directly jump to the next or previous group. |
| Solution | Used for sequence navigation through dialogs. Quickly jumps to dialog group embedded elements. Used for wide jump navigation.<br>The group jumps have to follow the reading order of target cultures.<br>Attention: Web based applications cannot be used in conjunction with Ctrl-Tab. This keystroke is mapped to frame navigation within the Internet Explorer. For this reason we have invented the GroupPos1 and GroupEnd jumps to indirectly jump between dialog groups. In web applications only these keystrokes have to be implemented. Gui Attention for ActiveX Controls or any other control like component. If the component implements several concurrent views within ist user interface, you need to track the group navigation keystrokes and handle them by yourself, as long as you need them. By giving a return code to the framework environment you can tell the framework, if the control used the keystroke or not. If you focus your last group item the next keystroke will be processed by the control (to set next focus in event on the first group of the control) and returning the environment, that this keystroke has to be processed by the |

Keyboard Mapping

| Function | Press | To | Severity |
|---|---|---|---|
| NextGroup | [Tab] | Dialog Group Skipping: Jump from the last UI element in a dialog group to next available dialog group. | Mandatory |
| GroupEnd | [Alt]+[End] | Dialog Group Skipping: Jump to last UI element in a dialog group | Mandatory |
| GroupForward | [Ctrl]+[Tab] | Sequence Navigation: Move focus to next dialog group | Mandatory |
| GroupBackward | [Shift]+[Ctrl]+[Tab] | Sequence navigation: Move focus to previous dialog | Mandatory |
| GroupPos1 | [Alt]+[Home] | Dialog Group Skipping: Jump to first UI element in a dialog group | Mandatory |

TABLE 1-continued i508 Tabstop

| | | | |
|---|---|---|---|
| Title | i508 Tabstop | | Accessibility Pattern |

Related Behaviors

| | |
|---|---|
| Context | Accessibility is needed for informational elements on the screen. |
| Description | Some information is put on the screen without having a chance to get keyboard access |
| Forces | User wants to understand the screen, but probably cannot achieve this due to important information he can not perceive visually. |
| Solution | Additional Tabstop for giving details to blind users. |

Keyboard Mapping

| Function | Press | To | Severity |
|---|---|---|---|
| TabStop | [Tab] | Adds an additional tabstop to the user interface group/element to say/braille details of current focus | Mandatory |

Increment/Decrement

| | | | |
|---|---|---|---|
| Title | Increment/Decrement | | Keyboard Handling Pattern |

Related Behaviors

| | |
|---|---|
| Context | Value input is needed that is related to the current value, such as the next day, or next |
| Description | Efficient use is, to quickly get to related values without the need to know the current value's context or format. |
| Forces | User wants to get to the next or previous related value |
| Solution | By using the plus and minus metaphors from mathematics, we offer a very quick possibility to achieve this. Format perception and additional user interaction to conform that specific format is reduced to a minimum. (In a date field this saves about 3-5 |

Keyboard Mapping

| Function | Press | To | Severity |
|---|---|---|---|
| LargeIncrement | [Shift]+[Ctrl]+[+] | Increment an even larger stepsize (example: one year) | Optional |
| LargeDecrement | [Shift]+[Ctrl]+[−] | Decrement an even larger stepsize | Optional |
| Decrement | [−] | Decrement one step | Mandatory |
| Increment | [+] | Increment one step (example: one day) | Mandatory |
| MediumIncrement | [Shift]+[+] | Increment a larger stepsize (example: one month) | Optional |
| MediumDecrement | [Shift]+[−] | Decrement a larger stepsize | Optional |

Indirect Scrolling

| | | | |
|---|---|---|---|
| Title | Indirect Scrolling | | Keyboard Handling Pattern |

Related Behaviors

| | |
|---|---|
| Context | Coding or text available in a text editor. Not all information is displayed. Current focus caret position should not be changed for gathering some additional information on the next lines, which are currently not visible. |
| Description | While using a slightly different scroll mechanism, the focus caret stays at the same place while the content scrolls up or down. |
| Forces | Focus caret position must be changed<br>Additional scroll is needed |
| Solution | Used in development tools to quickly scroll up the viewport content without losing the current focus/caret position. Mainly used for information gathering in previous or |

Keyboard Mapping

| Function | Press | To | Severity |
|---|---|---|---|
| ScrollUp | [Ctrl]-[Up] | Scrolls up the view without changing the focus | Mandatory |
| ScrollDown | [Ctrl]-[Down] | Scrolls down the view without changing the focus | Mandatory |

Information On Demand

| | | | |
|---|---|---|---|
| Title | Information On Demand | | Keyboard Handling Pattern |

Related Behaviors

| | |
|---|---|
| Context | Icon or text abbreviation is visible. |
| Description | Information perceived is not enough to understand. Additional information is needed to fully understand the element's visualization/action.<br>A keystroke shortcut is needed to quickly access the related function. The shortcut is not yet known by the user. |

TABLE 1-continued

| | |
|---|---|
| Forces | User needs more information |
| | User wants to quickly get access to a function. |
| Solution | Behavior to request the display of the tooltip or datatip window using the keyboard. |
| | The request can be used as toggle function to request or hide the tooltip or datatip |

Keyboard Mapping

| Function | Press | To | Severity |
|---|---|---|---|
| ImmediateHide | [Ctrl]+[Q] | Immediately hide the tooltip or datatip window. | Optional |
| ImmediateContextHe | [Shift]+[F1] | Immediately display the current field's contextual help in a help window (longer contextual help content) | Optional |
| ImmediateTooltipHel | [Ctrl]+[F1] | Immediately display the current field's contextual help in a tooltip | Optional |
| ImmediateDisplay | [Ctrl]+[Q] | Immediately display the tooltip or datatip window. | Mandatory |

Inplace Text Editing

| | | |
|---|---|---|
| Title | Inplace Text Editing | Keyboard Handling Pattern |
| Related Behaviors | DoubleClick (conflicting) | |
| Context | Text content available in a text editor | |
| Description | Text will be inserted, appended or deleted. | |
| Forces | User changes the current content | |
| Solution | Using the typical editing keys, the insertion or deletion of text content is available. | |

Keyboard Mapping

| Function | Press | To | Severity |
|---|---|---|---|
| AnyKey | [Any] | Key in data, no matter if numerical, special or character | Mandatory |
| DeleteNextChar | [Del] | Delete the character after the text cursor (insert mode), delete the character under the text caret in overwrite | Mandatory |
| DeletePrevChar | [Backspace] | Delete the character before the text cursor | Mandatory |
| CancelInplaceEditing | [Escape] | End inplace editing and revert changes made (can be used as a second undo method where an explicit inplace editing mode is available, such as on table. Example: Micrsoft Access table editing) | Optional |
| EndInplaceEditing2 | [Enter] | End inplace editing and accept changes made | Mandatory |
| EndInplaceEditing | [Tab] | End inplace editing and accept changes made | Mandatory |
| InvokeInplaceEditing | [F2] | Invoke inplace editing on an item. | Optional |

Item Quick Access

| | | |
|---|---|---|
| Title | Item Quick Access | Keyboard Handling Pattern |
| Related Behaviors | Sequence Quick Access; Auto Completion | |
| Context | A list is offered with many list items. The list may show 50 up to 20.000 or more list items. All items begin with A-Z letters, such as the last names of persons. | |
| Description | By typing the first characters of the last name, the lists automatically positions the focus near the best matching list item. | |
| Forces | Large list is presented | |
| | All item names do not begin with the same letters | |
| | User wants quickly focus a special item. | |
| Solution | The user types the first characters. When the first letter was typed a timer is being started to wait half a second for further keystrokes. If no more keystrokes occur and the timer runs out of time the repositioning to the best matching target item will be initiated. | |
| | If the given letters do not match the beginning of an item, the focus will be placed near the target, which means if a list does not contain any strings beginning with 's' the list | |

Keyboard Mapping

| Function | Press | To | Severity |
|---|---|---|---|
| Any | [any] | position the focus near the target item | Mandatory |

Item Selection

| | | |
|---|---|---|
| Title | Item Selection | Keyboard Handling Pattern |
| Related Behaviors | | |
| Context | A list of items is displayed. Some items are of interest, some others are not. | |
| Description | On the items of interest additional functions should be applied. | |
| Forces | User wants to select item(s) | |
| | User navigates the focus to items | |
| | User selects or deselects items | |
| | User proceeds with further actions | |

TABLE 1-continued

Solution: Item Selection is a paradigm to move the focus cursor independed from selection. The currently focussed items can be selected or unselected by using the spacebar.
This is generally used to select multiple items that are not grouped near each other.

Keyboard Mapping

| Function | Press | To | Severity |
|---|---|---|---|
| FocusMove | [Ctrl]+[Up\|Down\|Left\|Right] | The ctrl modifier key is used to single select items. Moves the focus cursor according to the used navigation keys without changing already selected item ranges. | Optional |
| Select&Deselect | [Space] or [Ctrl]+[Space] | Selects or deselects items in selected ranges or multiple selections. | Optional |
| UnSelect | [Up\|Down\|Left\|Right | Direct cursor movement without the shift modifier key usually deselects previously created selection ranges. | Mandatory |
| RangeSelect | [Shift] | The shift modifier key is used in conjunction with all focus navigation keystrokes to select items. | Mandatory |

Layout

| Title | Layout | Application Design Pattern |
|---|---|---|
| Related Behaviors | | |
| Context | Layout is needed. | |
| Description_ | Web based layouting behavior. | |
| Forces | | |
| Solution | | |

Keyboard Mapping

| Function | Press | To | Severity |
|---|---|---|---|
| none | none | Layouter automatically passes focus through all the embedded UI elements. Web based layouter do not grab focus, so focus management is automatically resolved in | Mandatory |

Level Navigation

| | | |
|---|---|---|
| Title | Level Navigation | Keyboard Handling Pattern |
| Related Behaviors | Free Cursor Navigation (conflicting) | |
| Context | Hierarchies | |
| Description | Navigation through hierarchical aligned data is needed. | |
| Forces | User navigates to related nodes within a hierarchical visualization. | |
| Solution | Tree Level Navigation, implemented to directly jump to dedicated places within hierarchical structures. Adds functionality to hierarchies where no functionality was available before. Design is derived from and related to the Outline View design of | |

Keyboard Mapping

| Function | Press | To | Severity |
|---|---|---|---|
| EquiLevelPos1 | [Alt]+[Ctrl]+[Home] | Jump to first element of current hierarchy level | Optional |
| UpperLevelJump | [Alt]+[Ctrl]+[Left] | Directly jump one level up (keeping the parent's node's state of displaying all child items) | Optional |
| CollapseAll | — | Collapse all expanded nodes within a hierarchy | Optional |
| HomeJump | [Numpad /] | Jumps to a special node, the home node. (Windows Explorer Dialogs: Jumps to documents and settings | Optional |
| ExpandAll | [Numpad *] | Expand all collapsed nodes in a hierarchy. | Optional |
| Up | [Up] | Move to previous item | Mandatory |
| Down | [Down] | Move to next item | Mandatory |
| Expand1 | [Right] | Expand a collapsed node, if node is already expanded move down to next available child node or child item. | Optional |
| Expand2 | [NumPad+] | Expand a collapsed node, does nothing if node is already expanded. | Mandatory |
| Collapse1 | [Left] | Collapse an expanded node, if the node is already collapsed the focus moves to parent node instead. | Optional |
| Collapse2 | [NumPad−] | Collapse an expanded node, does nothing if node is already collapsed. | Mandatory |
| EquiLevelNext | [Alt]+[Ctrl]+[Down] | Move to next element of current hierarchy level. If the current element is already the last element of current hierarchy level nothing happens. | Optional |
| EquiLevelPrevious | [Alt]+[Ctrl]+[Up] | Move to previous element of current hierarchy level. If the first element of current hierarchy level is already focussed nothing happens. | Optional |

TABLE 1-continued

| | | | |
|---|---|---|---|
| LowerLevelJump | [Alt]+[Ctrl]+[Right] | Directly jump one level down (same as "Down" on last child item) | Optional |
| EquiLevelEnd | [Alt]+[Ctrl]+[End] | Jump to last element of current hierarchy level | Optional |

Micro Navigation

| | | |
|---|---|---|
| Title | Micro Navigation | Keyboard Handling Pattern |

Related Behaviors

| | |
|---|---|
| Context | Multiple UI elements are available on the screen. |
| Description | All these items should be available via the keyboard. A keystroke offers to jump from one element to another: sequential navigation through all the elements. |
| Forces | forward navigation<br>backward navigation |
| Solution | Tab Chain<br>Applications may have to support different tab chain lists, depending on whether the user interface runs in an accessibility mode or not.<br>In a non-accessibility mode the tab chain only contains elements that are editable or read-only. Inactive elements or description texts such as labels or group labels cannot be focused with the keyboard.<br>In the accessibility mode the tab chain also contains all static elements or the descriptions of the element's visual representation, e.g. images. Elements containing no text or content that cannot be interpreted without a visual impression need a textual |

Keyboard Mapping

| Function | Press | To | Severity |
|---|---|---|---|
| Forward | [Tab] | Jump to next UI element available | Mandatory |
| Backward | [Shift]+[Tab] | Jump to the previous UI element | Mandatory |
| Forward2 | [Right Alt]+[Tab] | Jump to the next UI element, which is usually not within the tab chain. | Optional |

Object Editing

| | | |
|---|---|---|
| Title | Object Editing | Control Design Pattern |

Related Behaviors

| | |
|---|---|
| Context | Design Tool offers opportunity to position, align or size graphical objects. All objects have properties which can also be changed to the designer's taste. |
| Description | Multiple objects are placed on the client area of the design tool. Each of them should be changeable via keyboard. Efficient keyboard usage is requested, for example to change the font familiy on all objects in a single step. |
| Forces | object navigation<br>multiple object selection<br>multiple selected objects' properties editing<br>object respositioning<br>object sizing<br>object alignment |
| Solution | Three different modes are available:<br>a) Navigation<br>to navigate through all objects and select or deselect these.<br>b) Inplace Editing<br>to change object's IDs (for example)<br>c) Properties Editing<br>to change a single selected object's properties or to change multiple selected object's |

Keyboard Mapping

| Function | Press | To | Severity |
|---|---|---|---|
| MoveDownOnePixel | [Ctrl]+[Down] | Move element(s) one pixel down | Mandatory |
| ChangeHeight | [Shift]+[Up\|Down] | Reduces or enlarges the height of current element(s) | Mandatory |
| ChangeWidth | [Shift]+[Left\|Right] | Reduces or enlarges the width of current element(s) | Mandatory |
| MoveRightOnePixel | [Ctrl]+[Right] | Move element(s) one pixel right | Mandatory |
| MoveUpOnePixel | [Ctrl]+[Up] | Move element(s) one pixel up | Mandatory |
| NextElement | [Tab] | focus next element | Mandatory |
| MoveRight | [Right] | Move element(s) according to grid alignment (moves n pixels, n is the grid cell width) | Mandatory |
| MoveLeft | [Left] | Move element(s) according to grid alignment (moves n pixels, n is the grid cell width) | Mandatory |
| MoveUp | [Up] | Move element(s) according to grid alignment (moves n pixels, n is the grid cell height) | Mandatory |
| MoveDown | [Down] | Move element(s) according to grid alignment (moves n pixels, n is the grid cell height) | Mandatory |
| Edit | [F2] | Inline edit the element (for description texts on labels, | Mandatory |
| SelectAllElements | [Ctrl]+[a] | Selects all elements | Mandatory |

TABLE 1-continued

| | | | |
|---|---|---|---|
| PreviousElement | [Shift]+[Tab] | focus previous element | Mandatory |
| MoveLeftOnePixel | [Ctrl]+[Left] | Move element(s) one pixel left | Mandatory |
| EscapeEdit | [Escape] | Get out of inline editing | Mandatory |
| RequestProperties | [Alt]+[Enter] | display properties dialog or view, use a second keystroke to return focus to the element. | Mandatory |

Paging, horizontally

| | |
|---|---|
| Title | Paging, horizontally |
| | Keyboard Handling Pattern |

Related Behaviors

| | |
|---|---|
| Context | A document is displayed, the content is not fully visible. A paging metaphor is used to show/hide information. |
| Description | To browse through the information a paging mechanism is available. Similar to the vertical paging the horizontal paging offers to page through pages that are aligned side |
| Forces | User intends to page to next or previous page |
| Solution | Using the horizontal paging keystrokes he can achieve to see information left or right of the current view. |

Keyboard Mapping

| Function | Press | To | Severity |
|---|---|---|---|
| HorizPageLeft | [Alt]+[PageUp] | Page one horizontal page to the left | Mandatory |
| HorizFirstPage | [Alt]+[Home] | Page to first horizontal page if the list contains more than one horizontal page. | Optional |
| HorizLastPage | [Alt]+[End] | Page to last horizontal page. | Optional |
| HorizPageRight | [Alt]+[PageDown] | Page one horizontal page to the right | Mandatory |

Paging, vertically

| | |
|---|---|
| Title | Paging, vertically |
| | Keyboard Handling Pattern |

Related Behaviors

| | |
|---|---|
| Context | A document is displayed, the content is not fully visible. A paging metaphor is used to show/hide information. |
| Description | To browse through the information a paging mechanism is available. Similar to the horizontal paging the vertical paging offers to page through pages that are aligned one |
| Forces | User intends to page to next or previous page |
| Solution | Using the vertical paging keystrokes he can achieve to see information upside or below the current view. |

Keyboard Mapping

| Function | Press | To | Severity |
|---|---|---|---|
| PageUp | [PageUp] | Page up one page | Mandatory |
| PageDown | [PageDown] | Page down one page | Mandatory |
| FirstPage | [Ctrl]+[Home] | Directly jump to first page | Mandatory |
| LastPage | [Ctrl]+[End] | Directly jump to last page | Mandatory |

Paragraph Movement

| | |
|---|---|
| Title | Paragraph Movement |
| | Keyboard Handling Pattern |

Related Behaviors

| | |
|---|---|
| Context | Multiple sentences are displayed in a text editor or several rows in a grid cluster the same information. |
| Description | Jump to next or previous logical paragraph, chapter, segment or cluster. |
| Forces | User wants to jump from one paragraph/cluster to next/previous. |
| Solution | |

Keyboard Mapping

| Function | Press | To | Severity |
|---|---|---|---|
| NextParagraph | [Ctrl]-[Down] | Jump to the next paragraph in the text. A paragraph usually is a text area which is ended by a carriage return. | Mandatory |
| NextArea | [Ctrl]-[Right] | Jump to next visual area | Optional |
| PrevParagraph | [Ctrl]-[Up] | Jump to the previous paragraph in the text. | Mandatory |
| PreviousArea | [Ctrl]-[Left] | Jump to previous visual area | Optional |

TABLE 1-continued

Path Completion

| | | |
|---|---|---|
| Title | Path Completion | Keyboard Handling Pattern |
| Related Behaviors | Auto Completion; History List; Extras On Request | |
| Context | Enter an object identification based on hierarchy paths. | |
| Description | An object has to be specified which is located in a hierarchy.<br>Hierarchical information is known to the input field, so the input field offers a useful set of matching hierarchy items for further typing. The matching items will be displayed in a History List like dialog. | |
| Forces | User navigates to the element<br>User types in minimum information<br>Options list will appear, if keyed in characters match items in the hierarchy.<br>Using the [right] key a proposed value can be used | |
| Solution | | |

Keyboard Mapping

| Function | Press | To | Severity |
|---|---|---|---|
| Accept | [Enter] | accept current input field value | Optional |
| AcceptLeave | [Tab] or [Shift]+[Tab] | accept current input field value and jump to next field. | Mandatory |
| SelectProposed | [Down] or [Up] | select from a list of proposed values | Optional |
| UseProposed | [Right] | take over proposed extension for further input | Mandatory |
| Any | [any] | key in filename characters | Mandatory |

Properties Editing

| | | |
|---|---|---|
| Title | Properties Editing | Control Design Pattern |
| Related Behaviors | Object Editing; Extras On Request; Inplace Editing; Intrinsic Help; | |
| Context | Multiple properties of an object/element are displayed in a list. Properties will be changed. | |
| Description | For efficient object property editing multiple simultaneously selected items should be editable in a single step. This requires the property list to behave special:<br>a) The property list has to display those properties only that belong to all of the selected objects.<br>b) If the focussed property will be changed the changed value has to propagated to all selected objects.<br>c) Different property field value types (Date, Color, Curreny, Text, Code, Files, URLS, Enumerations, etc.)<br>d) Changes will be immediately propagated to selected objects for WYSIWYG visualization | |
| Forces | Navigation through all properties elements<br>Editing properties values<br>Switching to the object's visual representation in the design tool and back | |
| Solution | | |

Keyboard Mapping

| Function | Press | To | Severity |
|---|---|---|---|
| Down | [Down] | Navigate to the property below the current | Mandatory |
| Up | [Up] | Navigate to the property above the current | Mandatory |
| PrevProperty | [Shift]+[Tab] | Navigate to the previous property element | Mandatory |
| NextProperty | [Tab] | Navigate to the next property element | Mandatory |

Sequence Quick Access

| | | |
|---|---|---|
| Title | Sequence Quick Access | Keyboard Handling Pattern |
| Related Behaviors | Extras On Request; Item Quick Access | |
| Context | Combobox Element is focussed, the drop down list is not opened! | |
| Description | Quickly select items in a combobox element where the list window is not opened. By typing character keys a 'Item Quick Access' is possible. | |
| Forces | User focusses a combobox element<br>User did not open the list window<br>User navigates near the target list item by typing character keys<br>User navigates further to the target element | |
| Solution | Intention is to select the text "zeta" in a list with 500 list items.<br>By typing character keys "z" the combobox element jumps to item "zacharias". By typing cursor left two times the items "zack" and "zeta" appear.<br>In this example character keys were used to get near the target item (macro navigation), the cursor keys were used to specifiy the target (micro navigation). | |

TABLE 1-continued

Keyboard Mapping

| Function | Press | To | Severity |
|---|---|---|---|
| NextItem | [Right] | Select next item (example: in a combobox field with closed list window) | Mandatory |
| PrevItem | [Left] | Select previous item (example: in a combobox field with closed list window) | Mandatory |

Toggle Views

| | | |
|---|---|---|
| Title | Toggle Views | Keyboard Handling Pattern |

Related Behaviors

| | |
|---|---|
| Context | The display consists of an Overview and Detail. |
| Description | How to allow the user to navigate the data space via the overview. |
| Forces | a) The user needs to be able to jump from one location to another without viewing locations in between. |
| | b) The user should be aware of the context of the destination within the dataset. |
| | c) Discontinuous jumps between locations are commonplace. |
| Solution | Transfer the user from one location to another directly. |
| | Allow the user to click directly on any location in the overview. When the user clicks in the overview the detailed view should be rapidly updated to reflect the new location without showing locations in between. For example in the Windows ExplorerTM users typically jump from one directory to another without viewing the directories in between. This technique allows the user to rapidly view different portions of the dataset. Teleportation can be used in combination with Navigation Box in which case the visual location indicator in the overview can be positioned by clicking at the desired location as well as dragging the indicator to the desired location. |

Keyboard Mapping

| Function | Press | To | Severity |
|---|---|---|---|
| ToggleView | [Alt]+[Enter] | Toggle a view; jumps from a focussed element to the element's properties view. Jumps back if the properties view has the focus. Properties view should remember last focussed property name for next keyboard access. | Mandatory |

Undo/Redo

| | | |
|---|---|---|
| Title | Undo/Redo | Keyboard Handling Pattern |

Related Behaviors

| | |
|---|---|
| Context | Items, Text Editing |
| Description | Undo and Redo functionality for various kinds of UI elements. |
| Forces | User wants to undo last change |
| | User wants to do more than the last change |
| | User wants to undo things he just undid. (Redo) |
| Solution | Undo offers to return to a previous state (grid cell input, input field) or to return to multiple previous states (text editor). |
| | If something was undone by error a redo function offers to restore a version better than the one received with the last undo action. |

Keyboard Mapping

| Function | Press | To | Severity |
|---|---|---|---|
| Undo2 | [Alt]-[Backspace] | Undo last action, may be stacked so multiple undo steps are available. Recommended for text editors or forms. | Mandatory |
| Redo | [Ctrl]-[y] | Redo last undone actions. (optional) | Optional |
| Undo | [Ctrl]-[z] | Undo last action, may be stacked so multiple undo steps are available. Recommended for text editors or forms. | Mandatory |

View/Pane Handling

| | | |
|---|---|---|
| Title | View/Pane Handling | Keyboard Handling Pattern |

| | |
|---|---|
| Related Behaviors | Toggle Views; Group Navigation |
| Context | The application supports different simultaneous views or panes. |
| Description | Pane Handling gives the keystrokes to focus other views on the current screen. Next or previous panes can be focused depending on their appearance order. |
| Forces | next page |
| | previous pane |
| Solution | |

TABLE 1-continued

Keyboard Mapping

| Function | Press | To | Severity |
|---|---|---|---|
| PreviousPane | [Shift]+[Ctrl]+[F6] | Move focus to previous pane or view | Mandatory |
| FocusPaneHeader |  | Move focus to the pane's or view's header or splitter | Optional |
| NextPane | [Ctrl]+[F6] | Move focus to next pane or view | Mandatory |

Window Handling

| Title | Window Handling | Keyboard Handling Pattern |
|---|---|---|

Related Behaviors

| | |
|---|---|
| Context | Window layout does not correspond with user's need, relevant data is hidden, unrelevant information is available. |
| Description | The window position or extension has to be changed. |
| Forces | User repositions the window |
| | User resizes the window |
| | user changes display mode of a window (yet this mode handling is a difficult part) |
| Solution | Rearranging the user interface reveals information needed while unneeded information can be removed from the display. |

Keyboard Mapping

| Function | Press | To | Severity |
|---|---|---|---|
| SizeHeight | [Shift]+[Up\|Down] | Enlarges or reduces the window's height, after InitResize was issued | Optional |
| FullScreen | [F11] | Toggle FullScreen Display of current window. | Optional |
| MoveX | [Left\|Right] | Moves the window to the left or right, after InitMove was issued | Optional |
| MoveY | [Up\|Down] | Moves the window up or down, after InitMove was issued | Optional |
| TaskSwitch | [Alt]+[Tab] | Brings up the task switcher window and switches through all running programs. | Optional |
| Refresh | [Ctrl]+[r], [F5] | | Optional |
| SizeWidth | [Shift]+[Left\|Right] | Enlarges or reduces the window's width, after InitResize was issued | Optional |
| AccessSystemMenu | [Alt]+[Enter] | Access the main windows's system menu | Optional |
| QuitApplication | [Alt]+[F4] | Quits the application. On Windows the keystroke quits the applictaion if focus is on last opened app window. | Optional |
| Close | [Alt]-[F4] | close a window | Optional |
| CloseSubwindow | [Ctrl]-[F4] | close a window or view in an application framework window | Optional |
| ExtentVertically | <MouseAction> | move a splitter vertically | Optional |
| Minimize | [Alt]-[Space] then 'n' | minimize a window | Optional |
| Maximize | [Alt]-[Space] then 'x' | maximize a window | Optional |
| Restore | [Alt]-[Space] then 'r' | restores a window to standard size | Optional |
| InitResize | [Alt]-[Space] then 's' | sizes a window (width and height) | Optional |
| InitMove | [Alt]-[Space] then | moves a window (x and y position) | Optional |
| AccessMDIMenu | [Alt]+[-] | Access the child window's system menu | Optional |
| ExtentHoriz | <MouseAction> | move a splitter horizontally | Optional |

Zooming

| Title | Zooming | Keyboard Handling Pattern |
|---|---|---|

| | |
|---|---|
| Related Behaviors | Graphical Panning |
| Context | Details need to be visualized even more detailed. |
| Description | Zooming gives the ability to drill down or up the detail level of a display. |
| Forces | zooming in |
| | zooming out |
| | zooming to certain detail levels |
| | zooming to default level |
| Solution | Functions are offered to |
| | zoom in |
| | zoom out |
| | zoom to a specific detail level |
| | zoom to a default detail level |

Keyboard Mapping

| Function | Press | To | Severity |
|---|---|---|---|
| DefaultZoom | [Ctrl]+[Numpad Enter] | Zoom to default level. | Mandatory |
| LevelZoom | [Alt]+[Ctrl]+[1] ... | Zoom to a discrete zoom level [n]. | Optional |
| DefaultLevelZoom | [Alt]+[Ctrl]+[0] | Zoom to default level. | Optional |
| ZoomOut | [Ctrl]+[Numpad −] | Zoom out one step | Mandatory |
| ZoomIn | [Ctrl]+[Numpad +] | Zoom in one step | Mandatory |

The database system 100 can also include additional data besides the interaction patterns 110, keyboard controls 120, and associated mappings 130. For example, the database system 100 can also include a set of mouse controls that are also mapped to the interaction patterns 110. In addition, the database system 100 can include a set of mixed controls. Mixed controls are controls that require keyboard input combined with some other input (e.g, mouse, stylus, or voice input). The mixed controls can also be mapped to the interaction patterns 110.

The database system 100 can be a stand-alone system. Alternatively, it can be a component of a larger system, for example, of an application development system.

The database system 100 allows standard database operations to be performed. For example, users can browse the contents of the database, search the database, and generate reports based on the contents of the database.

Figure 5:
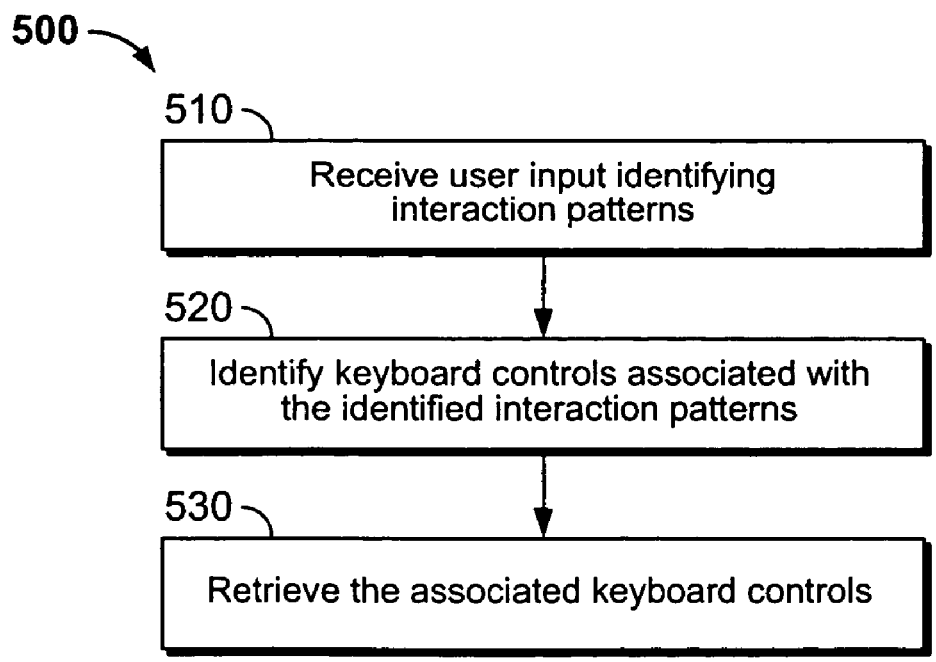
FIG. 5 illustrates a process for developing keyboard controls for an application.

Developers can use the database system 100 when developing keyboard controls for applications. For each application, the developer examines the application and selects one or more interaction patterns based on this examination. As shown in FIG. 5, during a method 500 in accordance with the invention, the database system 100 receives from the developer user input identifying the selected interaction patterns (step 510). In response, the database system identifies the keyboard controls associated with the selected interaction patterns (step 520) and retrieves the associated keyboard controls (step 530). The developer then uses the retrieved keyboard controls to develop the application. When the keyboard controls are developed using this process, the keyboard controls will be consistent across applications that have similar interaction patterns.

In some cases, a set of keyboard controls associated with a selected interaction pattern may overlap with another set keyboard controls associated with another selected interaction pattern. In such cases, a variety of techniques can be used to resolve the conflict. One technique is to examine the operations associated with each set of keyboard controls and determine which operations are more important in the context of the application being developed. The operations deemed more important are allowed to retain their keyboard controls. For the less important operations, these operations can be remapped to a different set of keyboard controls, or alternatively, the developer can decide not to provide keyboard handling for these operations.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims.

What is claimed is:

1. A database system comprising:
 a processor;
 a memory for storing program instructions; and
 a database for storing:
  a set of interaction patterns, each interaction pattern including a description of a human computer interaction problem, a solution to the problem, information describing a scenario where the interaction pattern is applicable, examples of how the interaction pattern has been used in specific application scenarios, and an identification of related patterns, wherein the related patterns are patterns that are suggested to be implemented in combination with the interaction pattern;
  a set of input controls; and
  mappings between the interaction patterns and the input controls;

wherein the database system is further configured to receive user input from a developer, the user input identifying and selecting, from the set of stored interaction patterns, one or more interaction patterns for inclusion in an application being developed by the developer; and wherein when a first set of input controls associated with a first interaction pattern overlaps with a second set of input controls associated with a second interactive pattern, the database system retains the mapping of the first set of input controls and remaps the second interactive pattern to a different set of input controls so that no overlap remains with the first set of input controls.

2. The database system of claim 1, wherein:
an input control in the set of the input controls comprises a keyboard control, and the keyboard control specifies a sequence of keystrokes.

3. The database system of claim 1, wherein:
the interaction patterns, the input controls, and the mappings are stored in one or more tables of the database.

4. The database of claim 1, wherein an input control in the set of input controls comprises a keyboard control, a mouse control, a voice input control, and a mixed control, wherein the mixed control is a combination of keyboard inputs, mouse inputs, and voice inputs.

5. A computer-readable storage device storing a computer program product which, when executed by a processor, causes a computer to perform a method comprising:
storing a set of interaction patterns in a database, an interaction pattern including a description of a human computer interaction problem, a solution to the problem, information describing a scenario where the interaction pattern is applicable, examples of how the interaction pattern has been used in specific application scenarios, and an identification of related patterns, wherein the related patterns are patterns that are suggested to be implemented in combination with the interaction pattern;
storing a set of input controls in the database;
associating each of the interaction patterns with one or more of the input controls;
receiving user input from a developer, identifying and selecting, from the set of interaction patterns, one or more interaction patterns for including in an application being developed by the developer;
determining whether a first set of input controls associated with a first interaction pattern overlaps with a second set of input controls associated with a second interactive pattern;
retaining the mapping of the first set of input controls when an overlap occurs with the second set of input controls; and
remapping the second interactive pattern to a different set of input controls so that no overlap remains with the first set of input controls.

6. The computer-readable storage device of claim 5, wherein:
an input control in the set of input controls comprises a keyboard control, and the keyboard control specifies a sequence of keystrokes.

7. The computer-readable storage device of claim 5, wherein:
the interaction patterns, the input controls, and the associations are stored in one or more tables of the database.

8. The computer-readable storage device of claim 5, further comprising:
in response to the user input, identifying the input controls associated with the selected interaction patterns and retrieving the associated input controls.

9. The computer-readable storage device of claim 5, wherein an input control in the set of input controls comprises a keyboard control, a mouse control, a voice control, and a mixed control, wherein the mixed control is a combination of keyboard inputs, mouse inputs, and voice inputs.

10. An apparatus comprising:
a processor; and
means for storing a set of interaction patterns in a database, and interaction pattern including a description of a human computer interaction problem, a solution to the problem, information describing a scenario where the interaction pattern is applicable, examples of how the interaction pattern has been used in specific application scenarios, and an identification of related patterns, wherein the related patterns are patterns that are suggested to be implemented in combination with the interaction pattern;
means for storing a set of input controls in the database;
means for associating each of the interaction patterns with one or more of the input controls; and
means for receiving user input from a developer, identifying and selecting, from the set of interaction patterns, one or more interaction patterns for including in an application being developed by the developer;
means for determining whether a first set of input controls associated with a first interaction pattern overlaps with a second set of input controls associated with a second interactive pattern;
means for retaining the mapping of the first set of input controls when an overlap occurs with the second set of input controls; and
means for remapping the second interactive pattern to a different set of input controls so that no overlap remains with the first set of input controls.

11. The apparatus of claim 10, wherein:
an input control in the set of input controls comprises a keyboard control, and the keyboard control specifies a sequence of keystrokes.

12. The apparatus of claim 10, wherein:
the interaction patterns, the input controls, and the associations are stored in one or more tables of the database.

13. The apparatus of claim 10, further comprising:
means for identifying, responsive to the user input, the input controls associated with the identified interaction patterns, and retrieving the associated input controls.

14. The apparatus of claim 10, wherein an input control in the set of input controls comprises a keyboard control, a mouse control, a voice control, and a mixed control, wherein the mixed control is a combination of keyboard inputs, mouse inputs, and voice inputs.

* * * * *